June 21, 1932.  G. BOLZ  1,864,118
WINDOW SEAT
Filed May 5, 1930
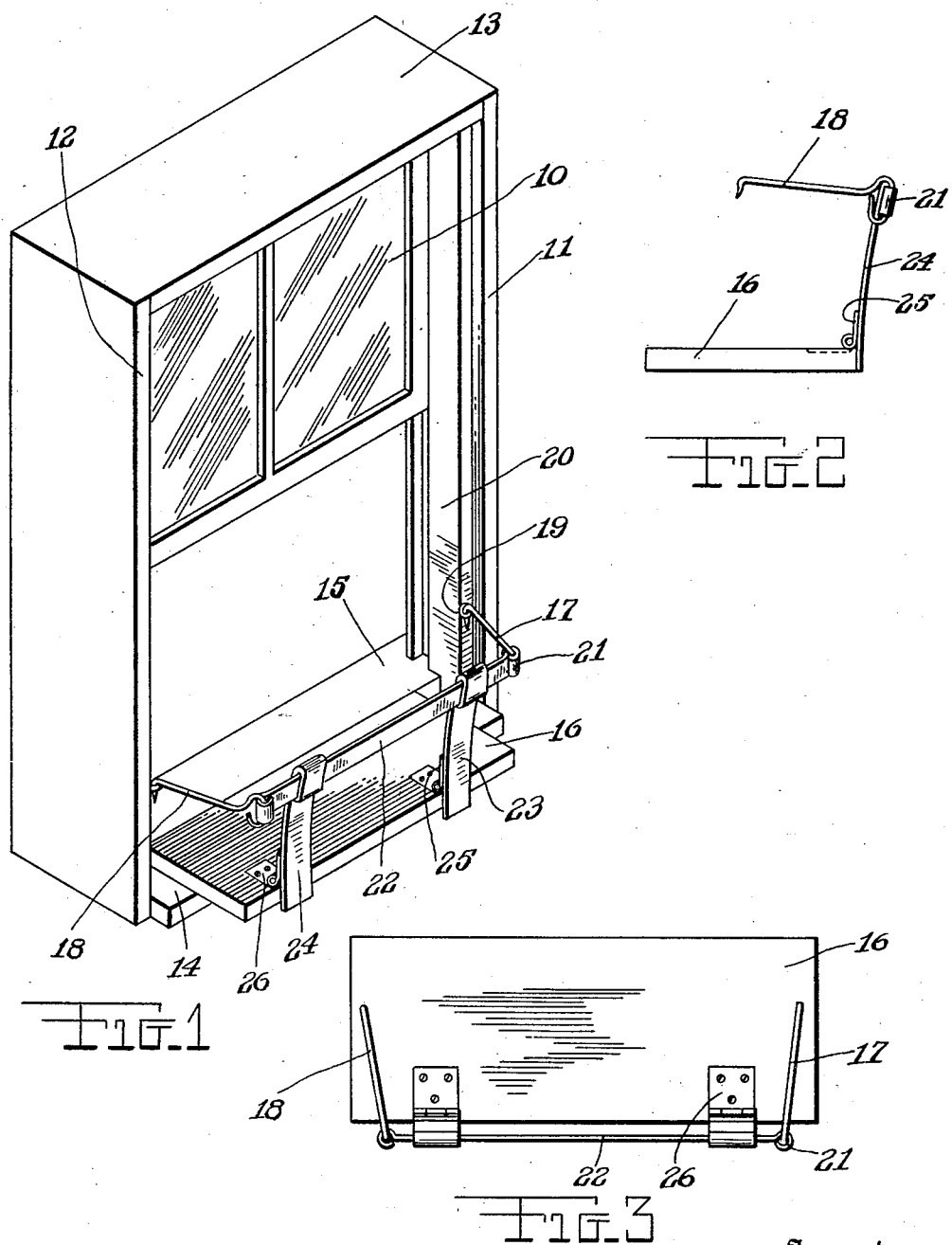
Inventor
G. Bolz
By his Attorney J. Ledermann Patented June 21, 1932

1,864,118

UNITED STATES PATENT OFFICE

GEORGE BOLZ, OF BROOKLYN, NEW YORK

WINDOW SEAT

Application filed May 5, 1930. Serial No. 449,863.

The main object of this invention is to provide a seat which may be attached to a window frame exteriorly of the same to provide a comfortable seat for the person desiring to clean the exterior surface of a window pane.

Another object of the invention is to provide a window seat which may be removably attached to the outside of a window frame so that a person may seat himself exteriorly of the window frame for the purpose of cleaning window panes or the like.

The above and other objects will become apparent in the description below in which characters of reference refer to like-named parts in the drawing.

Referring briefly to the drawing, Figure 1 is a perspective view of a window seat mounted in place thereon.

Figure 2 is an end elevation view of the window seat.

Figure 3 is a top plan view of Figure 2.

Referring in detail to the drawing, the numeral 10 indicates a window sash which is slidably mounted in a window frame. The window frame comprises side boards 11 and 12 which are connected by an end board 13 and a window sill 14. The window sill has mounted thereon a base board 15 which forms together with the window sill an internal shoulder. The front edge of a seat panel 16 rests on the window sill 14. This panel is retained in such seated position by a pair of hooks 17 and 18 which engage eyelets 19 mounted on the corners of retaining straps 20 of the window frame. The hook members 17 and 18 are rotatably engaged in hinge sleeves 21 formed at the ends of a substantially long back brace bar 22. This brace bar is supported upon a pair of straps 23 and 24. The straps are adapted to be folded downwardly to lie flat upon the seat panel 16. These straps are secured to one of the ears 25 of a pair of hinge members 26. Said hinges engage the straps rotatably to the seat panel 26. Said hinges engage the straps rotatably to the seat panel as indicated in Figure 1. The straps protrude downwardly from the hinge members 26 and these projected ends serve as a stay for retaining said straps 23 and 24 and said brace bars 22 in substantially upright position.

The device is adapted to serve as a seat for permitting the seating of a person exteriorly of a window frame when it is desired to cleanse the external surface of window panes. The window seat may be completely collapsed so that it may be readily stored in any small space. In collapsing the window seat the brace bar 22 is rotated downwardly about the hinge members 26 so that the straps 23 and 24 and said back brace bar 22 lie flat upon the seat panel. The hook members 17 and 18 may be turned 180 degrees from their usual position to a position where they lie flat upon the back brace bar when the seat is to be folded. In use, the back brace bar 22 and straps 23 and 24 are moved as a unit and are rotated about the hinge members 26 to an upright position as indicated in Figure 1. The forward edge of said panel 16 rests upon the window sill 14 and the hooks 17 and are caused to engage the eyelets 19 located on the window frame at the proper positions.

It is to be noted that certain changes in form and construction may be made without departing from the spirit and scope of the invention.

I claim:

A window seat comprising a seat panel, hinges secured to one edge of said panel, rearwardly bent upright rigid straps secured to said hinges near one end of said straps, the end of each strap extending beyond the hinge to provide an overlap adapted to limit the outward movement of said straps by contact of said overlap with the edge of the panel, the other ends of said straps being bent back to form substantially rectangular sleeves, a horizontal flat bar passing through said sleeves to provide the back of the seat, the ends of said bar being bent back to form channeled bands thereon, hooks pivotally attached to said bands and adapted to engage means on the window to secure the device to the window.

In testimony whereof I affix my signature.

GEORGE BOLZ.